Dec. 2, 1930.  J. J. BARRY  1,783,898
BRINING MACHINE
Filed Oct. 15, 1928  2 Sheets-Sheet 1

INVENTOR
JAMES J. BARRY
BY Fetherstonhaugh & Co
ATTORNEYS

Dec. 2, 1930.    J. J. BARRY    1,783,898
BRINING MACHINE
Filed Oct. 15, 1928    2 Sheets-Sheet 2

INVENTOR
JAMES.J.BARRY
BY Fetherstonhaugh&Co
ATTORNEYS

Patented Dec. 2, 1930

1,783,898

UNITED STATES PATENT OFFICE

JAMES J. BARRY, OF DARTMOUTH, NOVA SCOTIA, CANADA

BRINING MACHINE

Application filed October 15, 1928. Serial No. 312,689.

This invention relates to new and useful improvements in brining machines and particularly to fish brining machines, and the object of the invention is to provide an efficient brining machine which will have means for weighing the fish fed thereto, and automatic means for tipping it into a brining tank, and then discharging same from the tank.

Another object is to provide simple mechanism which will greatly facilitate the handling of the fish as it passes through the machine.

According to my invention I provide a machine having a weighing scoop and a brining scoop, said last mentioned scoop being adapted to receive fish from the weighing scoop, hold the fish for a predetermined time within the brining tank, and then discharge the fish after they have been cleaned in the brining tank. The scoops are controlled from a common source and the movements thereof are automatically controlled by suitable mechanism operated in conjunction with the bucket operating mechanism.

In the drawings which illustrate one form of my invention:—

Figure 1:
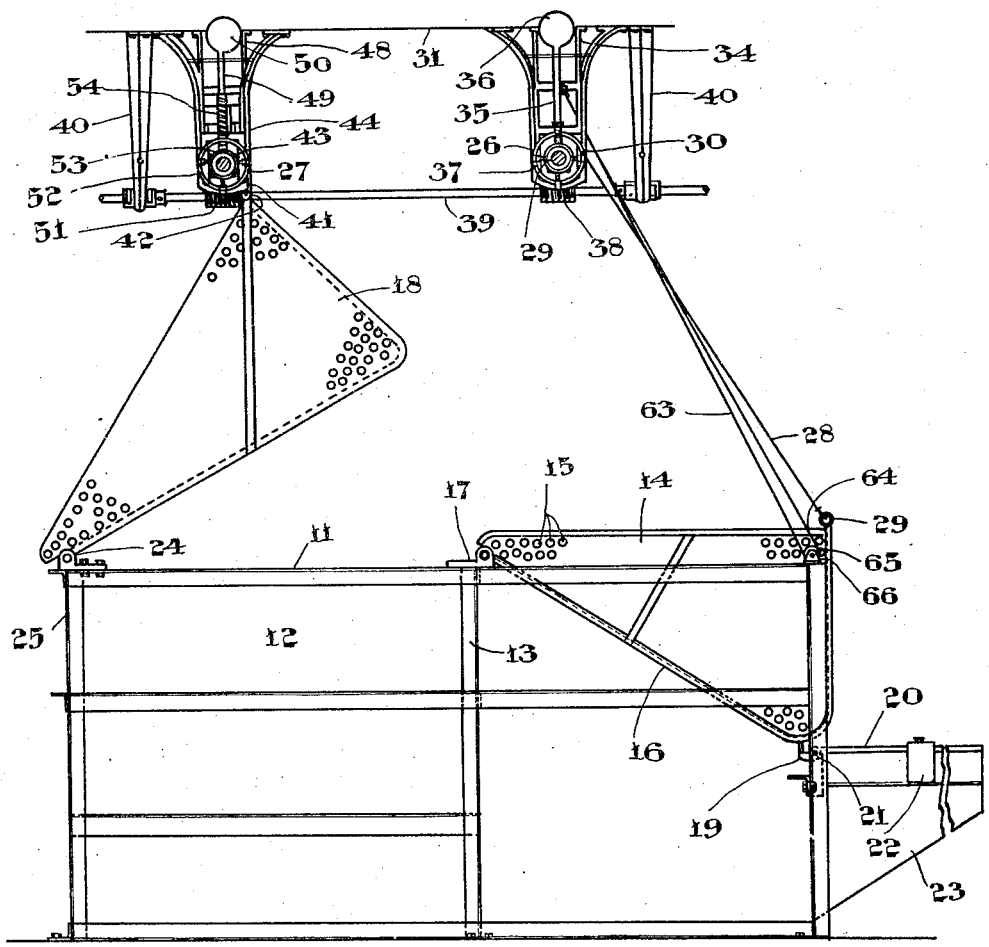
Figure 1 is a side elevation of my improved brining machine.
Figure 2:
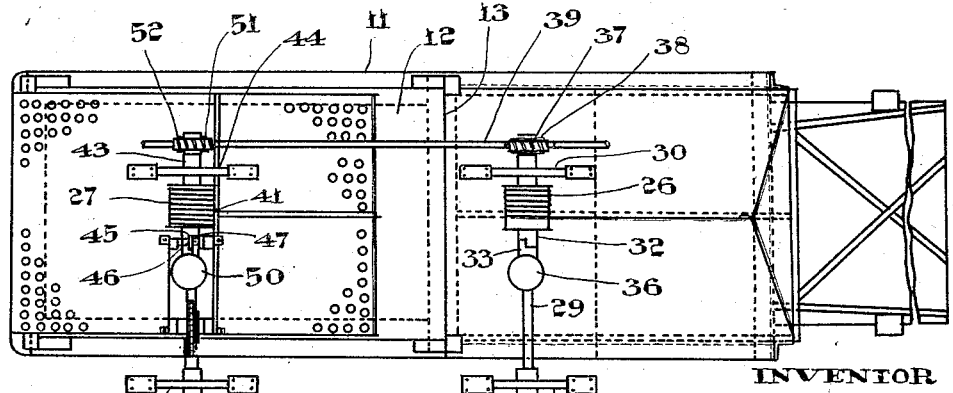
Figure 2 is a plan view of the machine shown in Figure 1.
Figure 3:
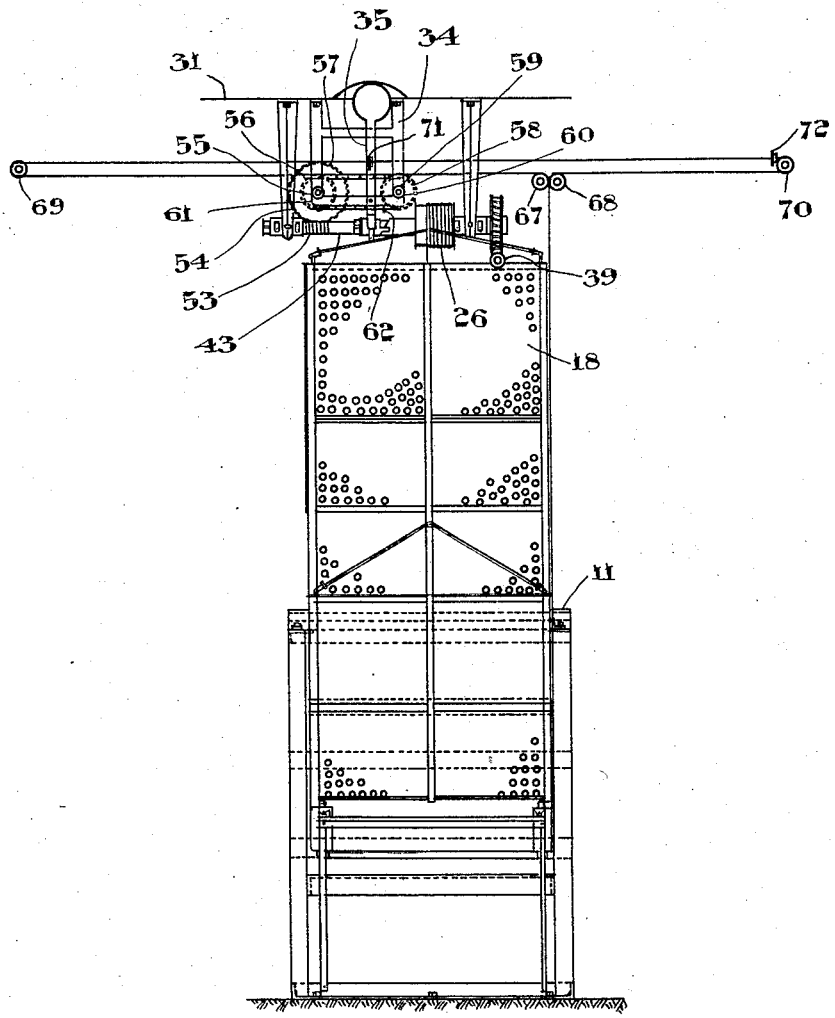
Figure 3 is an end elevation of the machine.

Referring more particularly to the drawings, 11 designates a frame having a brining tank 12 at one end thereof. The tank portion is separated from the remaining end of the frame by means of the partition 13. Hingedly attached along one edge to the frame in proximity to the partition is the weighing scoop 14 which is preferably built of perforated plates 15 at the sides and similar plates 16 at the bottom, and one end secured to suitable framing members 17. It will be seen that looking from the side of the machine, the scoop is of triangular form so that when the scoop is raised on its pivot it will dump or discharge the fish into a brining scoop 18 positioned within the brining tank. The bottom of the weighing scoop rests on the end 19 of a lever 20 when said scoop is in the fish receiving position shown in Figure 1. The lever 20 is pivotally mounted on a pin 21 in proximity to the end 19. A weight 22 is slidably mounted on the lever 20 and said weight rests on a bracket 23 secured to the frame. The position of the weight with respect to the pivot pin 21 regulates the weight of fish in the scoop. The brining scoop 18 is pivotally attached along one edge 24 to the end 25 of the frame. The brining scoop is preferably made of similar construction to the weighing scoop and is adapted to fit into the tank. The movement of the scoops is controlled by the mechanism hereinafter described. Positioned above the scoops are the lifting drums 26 and 27. The drum 26 is positioned approximately midway between the sides and above the scoop towards the hinged end thereof. The lifting scoop hoisting rope 28 is secured to an eyelet 29 on the end of the scoop, and the other end is secured to the drum. The drum 26 is rotatably mounted on a shaft 29 held in bearing 30 depending from the roof 31.

A toothed clutch 32 is formed in one end of the drum and slidably mounted on the shaft 29 is the clutch 33, the teeth of which are adapted to engage with the teeth of the drum clutch. The clutch 33 is adapted to rotate with the shaft 29. Pivotally secured to brackets 34 depending from the roof is the balance lever 35, the lower end of which engages with a groove not shown in the clutch 33. The weight 36 at the end of the lever is adapted to hold the clutch in or out of engagement with the clutch teeth on the drum. The shaft 29 has attached thereto a worm wheel 37 which is driven through a worm 38 secured to a shaft 39 rotatably mounted in bearings 40 and driven from a source not shown. The briner scoop lifting drum 27 is positioned centrally above and towards the hinged end of the scoop. A hoisting rope 41 is secured to an eye bolt or eye bolts 42 attached to the end of the scoop, while the other end is secured to the drum. The drum 27 is rotatably mounted on the shaft 43 rotatably mounted in the bearings 44 suspended from the roof. Teeth 45 are formed in one end of the drum and engaging with said teeth are the clutch teeth 46 of the clutch 47. The clutch is slidably mounted on a feather secured to the shaft 43. Pivotally attached to a bracket 48 is the lever 49, the lower end of which engages with a groove not shown, but formed in the clutch. The upper end of the lever is provided with a weight 50 which is adapted to hold the clutch in or out of engagement with the drum. The shaft 43 is driven from the shaft 39 through the worm 51 and worm wheel 52. A worm 53 is secured to the shaft 43 and engages with a worm wheel 54 which is secured to a spindle 55 having mounted thereon a toothed sprocket 56 of an endless chain 57, which passes over the sprocket wheel 58. The sprocket wheel 58 is mounted on a spindle 59 passing through a bearing 60. The spindle 55 is rotatably mounted in the bearing 61. Secured to the chain is the angle 62 which is adapted to engage with projections on the lever (not shown) to throw the lever in one direction for forcing the clutch into engagement with the drum and also to throw the lever so that the clutch is forced out of engagement with the drum during the operation of the mechanism. The weighing scoop is operated by means of a trip rope 63 which is secured to the edge of the scoop at a point marked 64. The trip rope passes around a pulley 65 rotatably mounted in a bracket 66 secured to the frame. The trip rope passes up over pulley 67 and 68 and then extends horizontally around the end pulley 69 and 70. Secured to the trip ropes are the trip catches 71 and 72 spaced a distance apart equal to the upward movement of the weighing scoop.

In operation the weighing scoop and the brining scoop are in the horizontal position with the brining scoop immersed in brine. The main driving shaft with the worms mounted thereon are rotating. Fish is fed into the weighing scoop until the weight therein overcomes the resistance to the weighing lever. The scoop then drops three inches and moves the trip rope so that the catch 72 engages with the clutch lever for the hoisting mechanism operating the weighing skip. The weighing scoop is immediately hoisted and dumps its load of fish into the brining scoop. As the weighing scoop rises, the trip rope is pulled until the catch 71 engages with the clutch lever to pull the clutch clear of the drum and the scoop drops by gravity. The brining scoop hoisting mechanism is time operated and is controlled by the worm and worm gearing. The clutch is pulled into and out of engagement with the brining scoop at predetermined intervals to raise the loaded scoop, which when emptied, drops back to its horizontal position.

The device is very simple in operation and the fish when weighed in the weighing scoop is automatically dumped into the brining scoop which is time operated through suitable mechanism. The device automatically dumps the fish when the fish have been submerged the proper length of time in the briner in order to clean same. This time is regulated by experiment. It will be seen that a fish briner operated in the manner herein described greatly facilitates the handling of fish with the minimum amount of labour and expense, and greatly reduces the cost of the brining of fish when compared with the methods at present in use.

Having thus described my invention, what I claim is:—

1. In a brining machine, a frame, a brining tank formed therein, a weighing scoop attached along one edge to the frame, a weighted balance lever secured to the frame and adapted to support the weighing scoop, a clutch controlled hoisting unit above the weighing scoop, means operated by the movement of the scoop, to control the clutch to raise or release the weighing scoop, a brining scoop in the brining tank adapted to receive material from the weighing scoop and a hoisting unit for the brining scoop.

2. In a brining machine, a frame, a brining tank formed in the frame, a weighing scoop pivotally secured along one edge in proximity to the tank, a balance lever secured to the frame for weighing the scoop, a clutch operated hoisting unit positioned above the weighing scoop and adapted to raise same, means for weighing the material in the scoop, means secured to the weighing scoop and adapted to operate the clutch to raise or lower the weighing scoop, a brining tank pivotally secured to the frame and adapted to receive material dumped from the weighing scoop, and a hoisting unit adapted to dump material from the brining scoop.

3. In a brining machine, a frame, a weighing scoop built of perforated material pivotally secured to the frame, a balance lever secured to the frame to weigh the material in the weighing scoop, a clutch controlled hoisting unit positioned above the weighing scoop, means secured to the scoop and adapted to operate the clutch to raise and release the weighing scoop, a brining tank formed in the frame, a perforated brining scoop pivotally attached along one edge to the frame and adapted to fit into the brining tank, said brining scoop being adapted to receive material dumped from the weighing scoop, and a hoisting unit above the brining scoop for raising and releasing same.

4. In a brining machine, a frame, a brining tank formed therein and at one end thereof, a perforated weighing scoop pivotally secured along one edge to the frame, a weighing beam pivotally secured to the frame and adapted to weigh the weighing scoop, a clutch operated hoisting unit for the weighing scoop, means secured to the weighing scoop and operating on said clutch to raise and release the weighing scoop through the hoisting unit, a brining scoop pivotally secured along one edge to the frame and adapted to receive material from the weighing scoop, a hoisting unit above the brining scoop, and means to operate the brining scoop hoisting mechanism.

5. A device according to claim 4 having both hoisting units operated from a common source.

6. A brining machine comprising a weighing scoop in which the material to be delivered to the brining means is initially placed, means for normally supporting the scoop in a material receiving position adapted to permit downward movement of the scoop when the latter is loaded with a predetermined weight of material and scoop hoisting means controlled by the aforesaid downward movement of the scoop for swinging said scoop to a material discharging position.

7. A brining machine comprising a brining tank, a pivotally mounted weighing scoop in which the material to be delivered to the brining tank is initially placed, means for supporting said scoop in a normal material receiving position, said means being yieldable to permit downward movement of the scoop when the latter is loaded with a predetermined weight of material, a normally inoperative scoop hoisting mechanism and means controlled by the aforesaid downward movement of the scoop for rendering said hoisting mechanism inoperative to swing the scoop to a discharging position whereby the material is transferred from the scoop to the brining tank.

8. A brining machine comprising a brining tank, a pivotally mounted brining scoop normally positioned in said tank, a pivotally mounted weighing scoop positioned in proximity to said tank, said weighing scoop being yieldingly supported in a material receiving position by means permitting a slight downward movement of the scoop when loaded with a predetermined weight of material and means controlled by the aforesaid downward movement of the weighing scoop for swinging said scoop to a discharging position, whereby the material contained therein is transferred to the brining scoop, and means for subsequently swinging said brining scoop to a material discharging position.

In witness whereof, I have hereunto set my hand.

JAMES J. BARRY.